(12) United States Patent
Yamada (10) Patent No.: US 8,422,446 B2
(45) Date of Patent: Apr. 16, 2013

(54) CONTROLLING POWER FOR CONTENTION BASED UPLINK TRANSMISSIONS

(75) Inventor: Shohei Yamada, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 370 days.

(21) Appl. No.: 12/819,160

(22) Filed: Jun. 18, 2010

(65) Prior Publication Data

US 2011/0310811 A1     Dec. 22, 2011

(51) Int. Cl.
    *H04W 4/00*     (2009.01)
(52) U.S. Cl.
    USPC ........................................... 370/329
(58) Field of Classification Search ............ 370/318, 370/320, 329, 335, 346; 455/522; 375/219
    See application file for complete search history.

(56) References Cited

U.S. PATENT DOCUMENTS

| | | | |
|---|---|---|---|
| 6,519,233 B1 * | 2/2003 | Gutierrez | 370/320 |
| 8,072,915 B1 * | 12/2011 | Gutierrez et al. | 370/318 |
| 2008/0159362 A1 * | 7/2008 | Gelbman et al. | 375/219 |
| 2008/0220806 A1 | 9/2008 | Shin et al. | |
| 2009/0176525 A1 | 7/2009 | Wang et al. | |
| 2009/0286566 A1 | 11/2009 | Lindholm et al. | |
| 2010/0041428 A1 | 2/2010 | Chen et al. | |

FOREIGN PATENT DOCUMENTS

| | | |
|---|---|---|
| JP | 2010-034612 | 2/2010 |
| JP | 2010-520711 | 6/2010 |
| WO | 2009/058074 | 5/2009 |

OTHER PUBLICATIONS

3GPP TS 36.213 V8.6.0, "Evolved Universal Terrestrial Radio Access (E-UTRA); Physical layer procedures (Release 8)," Mar. 2009.

Ericsson, "Details of Latency Reduction Alternatives," R2-096759, Nov. 2009.

International Search Report issued for International Patent Application No. PCT/JP2011/063300 on Sep. 13, 2011.

* cited by examiner

*Primary Examiner* — Raj Jain
(74) *Attorney, Agent, or Firm* — Austin Rapp & Hardman (57) ABSTRACT

A wireless communication device configured for controlling power for contention based uplink transmissions is described. The wireless communication device includes a processor and instructions stored in memory. The wireless communication device receives one or more power control parameters and performs contention based power control for uplink transmissions. The contention based power control is different from dynamic scheduled grant power control. The wireless communication device sends a contention based uplink transmission.

20 Claims, 9 Drawing Sheets

CONTROLLING POWER FOR CONTENTION BASED UPLINK TRANSMISSIONS

TECHNICAL FIELD

The present disclosure relates generally to communication systems. More specifically, the present disclosure relates to controlling power for contention based uplink transmissions.

BACKGROUND

Wireless communication devices have become smaller and more powerful in order to meet consumer needs and to improve portability and convenience. Consumers have become dependent upon wireless communication devices and have come to expect reliable service, expanded areas of coverage, and increased functionality. A wireless communication system may provide communication for a number of cells, each of which may be serviced by a base station. A base station may be a fixed station that communicates with wireless communication devices.

As wireless communication devices have advanced, improvements in controlling usage of resources (e.g., time and/or frequency resources) and reductions in interference have been sought. For example, wireless communication systems may have limited communication resources. As communication resource usage is better controlled, wireless communication devices may enjoy increased communication speed. Reductions in interference may also allow increased speed. Using power control is one way to reduce interference. As illustrated by this discussion, improved systems and methods for controlling power while using communication resources may be beneficial.

DETAILED DESCRIPTION

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (e.g., Release-8 and Release-10). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a user equipment (UE), an access terminal, a subscriber station, a mobile terminal, a remote station, a user terminal, a terminal, a subscriber unit, a mobile device, etc. A wireless communication device may be a cellular phone, a smart phone, a personal digital assistant (PDA), a laptop computer, a netbook, an e-reader, a wireless modem, etc. In 3GPP specifications, a wireless communication device is typically referred to as a user equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved or enhanced Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

In 3GPP LTE (Long Term Evolution) Release 8, the power control for a Physical Uplink Shared Channel (PUSCH) has three different configurations. More specifically, the three configurations include power control for PUSCH transmissions (or retransmissions) corresponding to a semi-persistent grant (j=0), for PUSCH transmissions (or retransmissions) corresponding to a dynamic scheduled grant (j=1) and for PUSCH transmissions (or retransmissions) corresponding to the random access response grant (j=2). Setting the User Equipment (UE) transmit power for the Physical Uplink Shared Channel (PUSCH) transmission in subframe i is illustrated in greater detail below (see Equation (1)).

In Release 10, on the other hand, contention based PUSCH transmission is introduced. In the uplink, E-UTRAN can dynamically allocate resources (e.g., Physical Resource Blocks (PRBs), Modulation and Coding Schemes (MCS), etc.) to a group of users at each Transmission Time Interval (TTI) using Contention Based (CB) grants. Uplink synchronized users (e.g., UEs) in the group are allowed to utilize the allocated resources on PUSCH with contention based grants for uplink transmission in a contention based manner without the need to transmit a Scheduling Request in advance. A UE (e.g., mobile terminal) may be allowed to transmit on contention based grants if it does not have a dedicated grant via the UE's own Cell Radio Network Temporary Identifier (C-RNTI). In the systems and methods disclosed herein, several configurations for efficient power control for contention based PUSCH transmission are described.

The contention based PUSCH is different from random access using a Physical Random Access Channel (PRACH). Both the random access and the contention based PUSCH have a possibility of contention or collision. A collision or contention may occur when two or more wireless communication devices (e.g., UEs) attempt to send data using the same resource (e.g., at the same time, on the same frequency, etc.). The resource for the random access is PRACH signaled by system information. On the other hand, the resource for the contention based PUSCH is PUSCH scheduled using a Physical Downlink Control Channel (PDCCH). Furthermore, the contention based PUSCH does not need the PRACH preamble transmission or a Physical Uplink Control Channel (PUCCH) scheduling request transmission before PUSCH transmission. Namely, the contention based PUSCH does not need to transmit a Scheduling Request in advance.

A wireless communication device configured for controlling power for contention based uplink transmissions is disclosed. The wireless communication device includes a processor and instructions stored in memory. The wireless communication device receives one or more power control parameters and performs contention based power control for uplink transmissions. The contention based power control is different from dynamic scheduled grant power control. The wireless communication device also sends a contention based uplink transmission.

The wireless communication device may also manage a power control adjustment state. The contention based power control may use one or more parameters different from parameters used for the dynamic scheduled grant power control. The contention based power control may use one or more contention based power control functions that are different from a normal power control function used for the dynamic scheduled grant power control.

The one or more power control parameters may be signaled by a higher layer. The one or more power control parameters may include a parameter specific to the wireless communication device. The one or more power control parameters may include a parameter specific to a cell.

The wireless communication device may further receive a contention based grant. The contention based grant may include a power control command. The wireless communication device may be a User Equipment (UE).

A method for controlling power for contention based uplink transmissions is also disclosed. The method includes receiving one or more power control parameters and performing, on a wireless communication device, contention based power control for uplink transmissions. The contention based power control is different from dynamic scheduled grant power control. The method further includes sending a contention based uplink transmission.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods. As used herein the term "plurality" may indicate two or more. For example, a plurality of components refers to two or more components.

Figure 1:
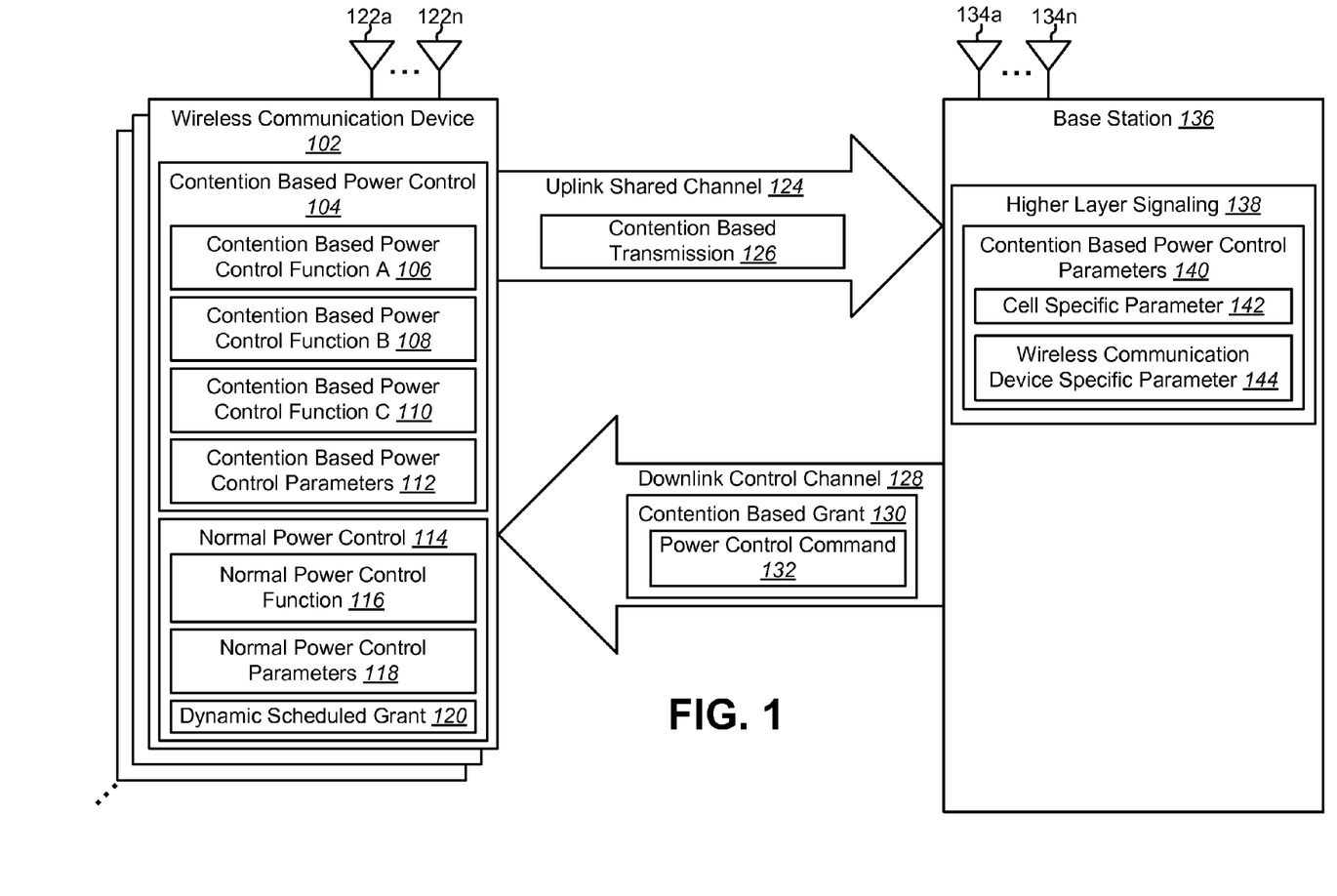
FIG. 1 is a block diagram illustrating one configuration of one or more wireless communication devices and a base station in which systems and methods for controlling power for contention based uplink transmissions may be implemented.

FIG. 1 is a block diagram illustrating one configuration of one or more wireless communication devices 102 and a base station 136 in which systems and methods for controlling power for contention based uplink transmissions may be implemented. The one or more wireless communication devices 102 communicate with the base station 136 using one or more antennas 122a-n. For example, the wireless communication device 102 transmits electromagnetic signals to the base station 136 and receives electromagnetic signals from the base station 136 using the one or more antennas 122a-n. The base station 136 communicates with the one or more wireless communication devices 102 using one or more antennas 134a-n. A User Equipment (UE) pursuant to 3GPP specifications is one example of a wireless communication device 102 and an evolved Node B (eNB) pursuant to 3GPP specifications is one example of a base station 136.

The one or more wireless communication devices 102 and the base station 136 may use multiple channels to communicate with each other. In the configuration illustrated in FIG. 1, the one or more wireless communication devices 102 use an uplink shared channel 124 to communicate with or transmit data to the base station 136. For example, multiple wireless communication devices 102 may concurrently use the uplink shared channel 124. One example of an uplink shared channel 124 is a Physical Uplink Shared Channel (PUSCH) pursuant to 3GPP specifications. The base station 136 may use a downlink control channel 128 to send control information to the one or more wireless communication devices 102. For example, the base station 136 may schedule or grant communication resources on the uplink shared channel 124 to one or more wireless communication devices 102 by sending messages (e.g., grants) on the downlink control channel 128. One example of a downlink control channel 128 is a Physical Downlink Control Channel (PDCCH) pursuant to 3GPP specifications.

The wireless communication device 102 may include a normal power control module 114. The normal power control module 114 may be a hardware and/or software module that provides power control to the wireless communication device 102 for certain grants. For example, the normal power control module 114 may use a normal power control function 116 and one or more normal power control parameters 118 to control transmission power for a semi-persistent grant, a dynamic scheduled grant 120 and/or a random access response grant. For instance, the wireless communication device 102 may perform dynamic scheduled grant power control using the normal power control function 116 and/or dynamic scheduled grant power control parameters (which may be included in normal power control parameters 118). As used herein, "power control" generally denotes controlling the transmit power for the wireless communication device 102. For example, the wireless communication device 102 may control its 102 transmit power based on one or more power control functions 106, 108, 110, 116 and one or more power control parameters 112, 118. For instance, power control 104, 114 may increase, decrease or maintain wireless communication device 102 transmit power based on the power control functions 106, 108, 110, 116 and power control parameters 112, 118.

The wireless communication device 102 may include a contention based power control module 104. The contention based power control module 104 may be a hardware and/or software module used to control wireless communication device 102 transmit power while the wireless communication device 102 generates and/or sends a contention based transmission 126 on the uplink shared channel 124. For example, the base station 136 may generate and/or send a contention based grant 130 to one or more wireless communication devices 102. The contention based grant 130 may indicate that the one or more wireless communication devices 102 are permitted to attempt a contention based transmission 126 on the uplink shared channel 124. The contention based grant 130 may further indicate which resources the one or more wireless communication devices 102 are allowed to use when attempting a contention based transmission 126. In one configuration, the contention based grant 130 also includes a power control command 132. Including a power control command 132 in a contention based grant 130 may allow the base station 136 and/or the one or more wireless communication devices 102 to dynamically control power for a contention based transmission 126. In another configuration, the contention based grant 130 may not include a power control command 132. Alternatively or in addition, a power control command 132 may be sent separately from the contention based grant 130.

The contention based power control module 104 may include contention based power control function A 106, contention based power control function B 108 and/or contention based power control function C 110. The contention based power control functions A, B and C 106, 108, 110 are different from the normal power control function 116 included in the normal power control module 114. For example, the contention based power control functions 106, 108, 110 may be defined differently, use different parameters, use additional parameters and/or use fewer parameters than the normal power control function 116. The wireless communication device 102 may use one or more contention based power control functions 106, 108, 110 to control its 102 transmit power during a contention based transmission 126.

The contention based power control module 104 may also include and/or receive contention based power control parameters 112. The contention based power control parameters 112 may include parameters that are different from the normal power control parameters 118.

The base station 136 may provide or signal one or more parameters to the wireless communication device 102 using higher layer signaling 138. For example, the systems and methods disclosed herein may be focused on the physical layer. However, higher layers in a wireless communication system may be used. For instance, higher layers in LTE include the Radio Resource Control (RRC) layer, the Radio Link Control (RLC) layer and the Medium Access Control (MAC) layer. These higher layers may generate one or more of the normal power control parameters 118 and/or contention based power control parameters 112 used on the wireless communication device 102 for power control. For example, some of the parameters may be provided by a Physical Downlink Control Channel (PDCCH). As illustrated in FIG. 1, the higher layer signaling 138 may include contention based power control parameters 140. The contention based power control parameters 140 may include a cell specific parameter 142 and/or a wireless communication device specific parameter 144. The cell specific parameter 142, for example, may apply to all of the wireless communication devices 102 being served by the base station 136 in a geographical cell. A cell may be a geographical area in which the base station 136 communicates with and/or serves one or more wireless communication devices 102. The wireless communication device specific parameter 144 may only apply to one of the wireless communication devices 102 being served by the base station 136, for example. The contention based power control parameters 140 may be signaled to the one or more wireless communication devices 102 on the downlink control channel 128, for example. The contention based power control parameters 140 may be used by the wireless communication device 102 to perform power control. The base station 136 may also send other parameters to the one or more wireless communication devices 102, such as additional contention based power control parameters 112 and/or normal power control parameters 118.

In one configuration, the contention based power control module 104 may use the contention based power control parameters 112 in conjunction with the normal power control function 116 to perform power control for a contention based transmission 126. In other words, the power control function 116 that is typically used for other types of grants (e.g., a dynamic scheduled grant 120) may be used for contention based power control 104 by using contention based power control parameters 112 that are different from and/or additional to the normal power control parameters 118 used for other kinds of grants.

In another configuration, the contention based power control module 104 uses one or more of the contention based power control functions 106, 108, 110 in order to control wireless communication device 102 transmit power for a contention based transmission 126. For example, the wireless communication device 102 may use only contention based power control function A 106, contention based power control function B 108, contention based power control function C 110 or any combination of the three contention based power control functions 106, 108, 110. In some configurations, the wireless communication device 102 may use any of the contention based power control functions 106, 108, 110 or any combination of them 106, 108, 110 in conjunction with normal power control parameters 118. In other configurations, the wireless communication device 102 may use any of the contention based power control functions 106, 108, 110 or any combination of them 106, 108, 110 in conjunction with contention based power control parameters 112. In yet another configuration, the wireless communication device 102 may use any of the contention based power control functions 106, 108, 110 or any combination of them 106, 108, 110 in conjunction with a combination of normal power control parameters 118 and contention based power control parameters 112.

Figure 2:
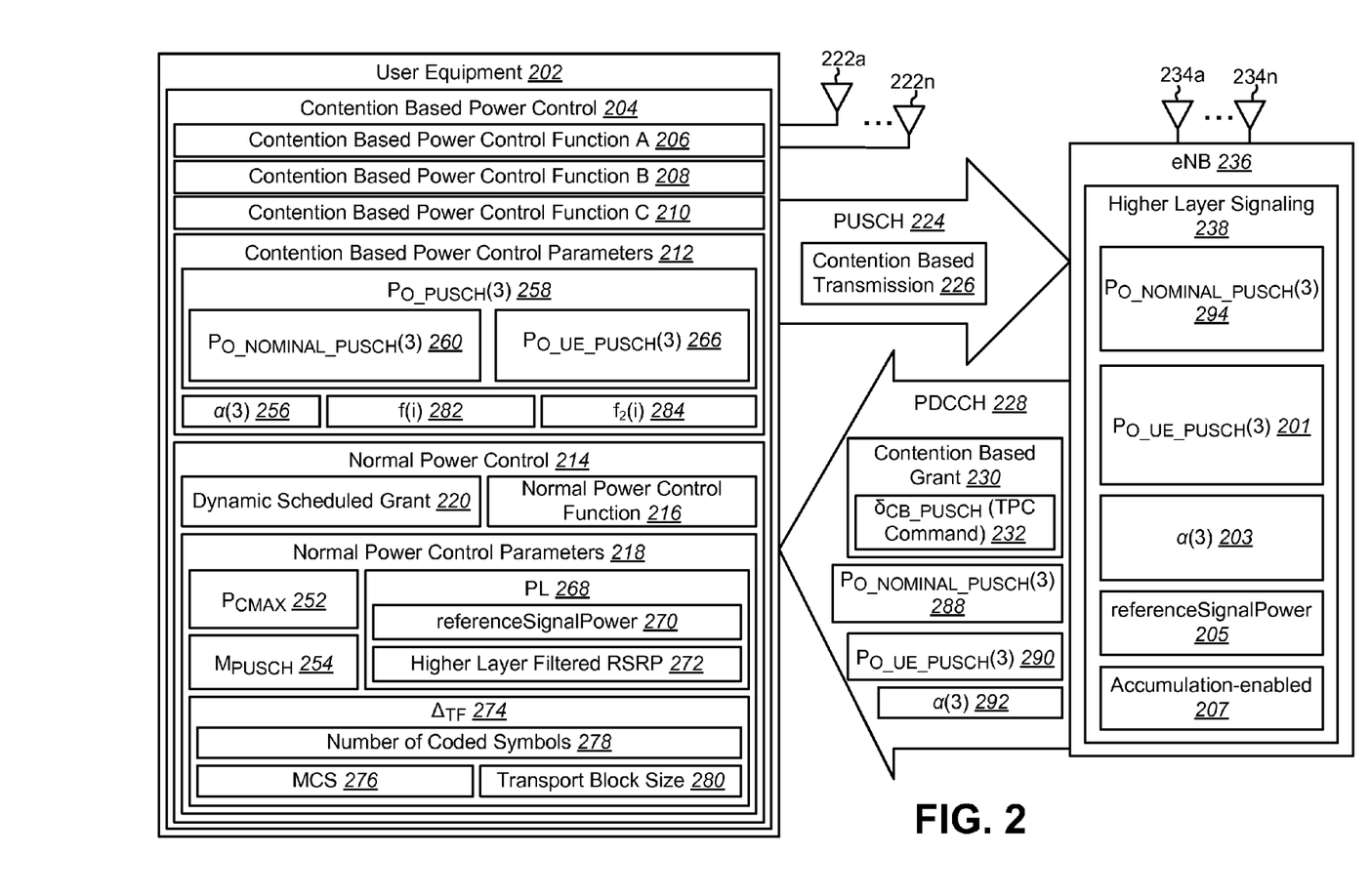
FIG. 2 is a block diagram illustrating several configurations of a User Equipment (UE) in which systems and methods for controlling power for contention based uplink transmissions may be implemented.

FIG. 2 is a block diagram illustrating several configurations of a User Equipment (UE) 202 in which systems and methods for controlling power for contention based uplink transmissions may be implemented. In FIG. 2, the systems and methods are described in terms of 3GPP specifications. However, this should not limit the scope of the disclosure, since at least some features of the systems and methods described herein may be applied to other systems. The UE 202 communicates with the eNB 236 using one or more antennas 222a-n. Similarly, the eNB 236 communicates with the UE 202 using one or more antennas 234a-n.

The UE 202 may include a contention based power control module 204 and a normal power control module 214. An example of one configuration of the normal power control module 214 is given hereafter. In one configuration, the normal power control module 214 operates in accordance with Release-8 power control. The normal power control module 214 may include normal power control parameters 218. For example, the normal power control parameters 218 may include $P_{CMAX}$ 252, $M_{PUSCH}$ 254, PL 268, and $\Delta_{TF}$ 274. More detail regarding these normal power control parameters 218 is given below.

The normal power control module 214 may use a normal power control function 216. For example, the UE 202 may apply the normal power control parameters 218 to the normal power control function 216. The UE 202 may use the normal power control function 216 to set its 202 transmit power $P_{PUSCH}(i)$ (in decibels relative to one milliwatt (dBm)) for a Physical Uplink Shared Channel (PUSCH) 224 transmission in subframe i as illustrated in Equation (1). In other words, the normal power control function 216 may be formulated according to Equation (1).

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} \quad (1)$$

In Equation (1), $P_{CMAX}$ is the configured UE transmitted power and $M_{PUSCH}(i)$ is the bandwidth of the PUSCH 224 resource assignment expressed in number of resource blocks valid for subframe i. Furthermore, $P_{O\_PUSCH}(j)$ is a parameter comprising the sum of a cell specific nominal parameter or component $P_{O\_NOMINAL\_PUSCH}(j)$ (provided from higher layers 238 for j=0, 1) and a UE specific parameter or component $P_{O\_UE\_PUSCH}(j)$ (provided by higher layers 238 for j=0, 1). j=0 for PUSCH 224 transmissions or retransmissions corresponding to a semi-persistent grant. j=1 for PUSCH 224 transmissions or retransmissions corresponding to a dynamic scheduled grant 220. j=2 for PUSCH 224 transmissions or retransmissions corresponding to a random access response grant. $P_{O\_UE\_PUSCH}(2)=0$ and $P_{O\_NOMINAL\_PUSCH}(2)=P_{O\_PRE}+\Delta_{PREAMBLE\_Msg3}$. The parameter PREAMBLE_INITIAL_RECEIVED_TARGET_POWER ($P_{O\_PRE}$) and $\Delta_{PREAMBLE\_Msg3}$ are signaled from higher layers 238.

For j=0 or 1, $\alpha(j)$ may be represented by a 3 bit number, whose value is an index pointing to an element of the set $\alpha \in \{0, 0.4, 0.5, 0.6, 0.7, 0.8, 0.9, 1\}$. This index may be a cell specific parameter provided by higher layers 238. For j=2, $\alpha(j)=1$. PL 268 is a downlink path loss estimate calculated in the UE 202 in decibels (dB). PL=referenceSignalPower–higher_layer_filtered_RSRP, for example. referenceSignalPower 270 is provided by higher layers 238 (e.g., referenceSignalPower 205 may be measured by the UE 202 and/or sent from the eNB 236). higher_layer_filtered_RSRP 272 is a Reference Signal Received Power. For example, the UE 202 may use some filtering (algorithm or computational mechanism) to determine higher_layer_filtered_RSRP 272. $\Delta_{TF}$ 274 is a parameter based on the transport format of the PUSCH 224. The transport format may be based on a Modulation and Coding Scheme (MCS) 276, transport block size 280, and/or a number of coded symbols 278, for example.

$\delta_{PUSCH}$ is a UE specific correction value, also referred to as a Transmit Power Control (TPC) command. $\delta_{PUSCH}$ may be sent on the Physical Downlink Control Channel (PDCCH) 228 (with a Downlink Control Information (DCI) format 0) or jointly coded with other TPC commands in the PDCCH 228. When jointly coded with other TPC commands, a DCI format 3/3A format may be used whose Cyclic Redundancy Check (CRC) parity bits are scrambled with a Transmit Power Control-Physical Uplink Shared Channel-Radio Network Temporary Identifier (TPC-PUSCH-RNTI).

$f(i)$ is the current PUSCH 224 power control adjustment state. $f(i)$ may be defined as illustrated in Equation (2) if accumulation is enabled.

$$f(i) = f(i-1) + \delta_{PUSCH}(i-K_{PUSCH}) \quad (2)$$

In Equation (2), $i-K_{PUSCH}$ is a subframe number that provides a TPC command, where i is the subframe number of a PUSCH transmission. For example, in a Frequency Division Duplex (FDD) case, $K_{PUSCH}$ may be a fixed value of 4. In a Time Division Duplex (TDD) case, $K_{PUSCH}$ may be a variable based on a Downlink (DL) and/or Uplink (UL) subframe configuration. and Accumulation may be enabled based on a UE-specific parameter Accumulation-enabled 207 (which may be provided by higher layers 238) or if the TPC command $\delta_{PUSCH}$ is included in a PDCCH 228 with DCI format 0 where the CRC is scrambled by the temporary C-RNTI. For example, $\delta_{PUSCH}(i-K_{PUSCH})$ may be signaled on the PDCCH 228 with DCI format 0 or 3/3A on subframe $i-K_{PUSCH}$. Furthermore, $f(0)$ may be the first value after reset of accumulation.

The UE 202 may attempt to decode a PDCCH 228 of DCI format 0 with the UE's 202 C-RNTI or Semi-Persistent Scheduling (SPS) C-RNTI. Furthermore, the UE 202 may attempt to decode a PDCCH 228 of DCI format 3/3A with the UE's 202 TPC-PUSCH-RNTI in every subframe except when in Discontinuous Reception (DRX). If DCI format 0 and DCI format 3/3A are both detected in the same subframe, the UE 202 may use the $\delta_{PUSCH}$ provided in DCI format 0. $\delta_{PUSCH}=0$ decibels (dB) for a subframe where no TPC command is decoded. The $\delta_{PUSCH}$ dB accumulated values may be signaled on the PDCCH 228 with DCI format 0 or DCI format 3/3A. The UE 202 may reset accumulation when the $P_{O\_UE\_PUSCH}$ value is changed by higher layers 238 or when the UE 202 receives a random access response message.

$f(i)$ may be defined as illustrated in Equation (3) if accumulation is not enabled.

$$f(i) = \delta_{PUSCH}(i-K_{PUSCH}) \quad (3)$$

Accumulation may not be enabled based on the UE-specific parameter Accumulation-enabled 207 provided by higher layers 238. $\delta_{PUSCH}(i-K_{PUSCH})$ may be signaled on the PDCCH 228 with DCI format 0 on subframe $i-K_{PUSCH}$. The $\delta_{PUSCH}$ absolute values (in dB) may be signaled on the PDCCH 228 with DCI format 0. $f(i)=f(i-1)$ for a subframe where no PDCCH 228 with DCI format 0 is decoded.

For both types of $f(*)$ (accumulation or current absolute), the first value may be set as follows. If the $P_{O\_UE\_PUSCH}$ value is changed by higher layers 238, $f(0)=0$. Otherwise, $f(0)=\Delta P_{rampup}+\delta_{msg2}$. $\delta_{msg2}$ is a TPC command indicated in a random access response and $\Delta P_{rampup}$ is provided by higher layers 238 and corresponds to the total power ramp-up from the first to the last preamble.

An example of one configuration of power control for a contention based PUSCH 224 is given hereafter. Because the contention based PUSCH 224 is used by a UE 202 with uplink timing alignment, the power control for PUSCH transmissions or retransmissions corresponding to a dynamic scheduled grant 220 (e.g., the normal power control function 216) can be used. The UE 202 keeps or manages the current PUSCH power control adjustment state given by $f(i)$ as the UE 202 can return to a normal power control procedure after the contention based PUSCH transmission 226. The UE 202 monitors a contention based grant 230. If the UE 202 detects a contention based grant 230, the UE 202 performs a contention based PUSCH transmission 226.

In this configuration, the transmit power for the contention based PUSCH transmission (or retransmission) 226 corresponding to the contention based grant 230 is computed or generated using the normal power control function 216 for PUSCH transmissions (or retransmissions) corresponding to a dynamic scheduled grant 220. In this way, the contention based 230 grant does not carry a TPC command 232 (for contention based transmissions, for example). For example, the region for the TPC command 232 in the contention based grant 230 (e.g., the part of the contention based grant 230 used for a power control command 232) is reserved or used for another purpose. Therefore, the normal power control 214 of the UE 202 may not be influenced by the contention based grant 230 or contention based PUSCH transmission 226. There is a possibility that a contention based PUSCH transmission 226 and a normal PUSCH transmission are exchanged between subframes as the UE 202 follows the detected grant (e.g., the contention based grant 230, the dynamic scheduled grant 220 or semi persistent grant, etc.) in the subframe.

Several configurations of the contention based power control module 204 are described hereafter. In other words, several configurations of power control 204 for contention based transmissions 226 on a PUSCH 224 are described. The contention based power control module 204 may include contention based power control function A 206, contention based power control function B 208, contention based power control function C 210 and/or contention based power control parameters 212. More detail on the contention based power control functions 206, 208, 210 is given below. The contention based power control parameters 212 may include $P_{O\_PUSCH}(3)$ 258 (which may include $P_{O\_NOMINAL\_PUSCH}(3)$ 260 and/or $P_{O\_UE\_PUSCH}(3)$ 266), $\alpha(3)$ 256, $f(i)$ 282 and/or $f_2(i)$ 284. More detail on the contention based power control parameters 212 is given below.

In some deployment scenarios, it may be beneficial to mitigate the interference caused by a contention based PUSCH transmission 226. A collision may occur between contention based PUSCH transmissions 226 from a plurality of (e.g., two or more) UEs 202. It may be beneficial to differentiate power control 204 for a contention based PUSCH transmission 226 from power control (e.g., normal power control 214) for a dynamic scheduled grant 220 PUSCH transmission. For example, by this differentiation, a base station 136 (e.g., eNB 236) may set the power for a contention based (PUSCH 224) transmission 126 lower than normal power control. Thus, this low power transmission may mitigate or reduce the interference caused by the collision of multiple wireless communication devices 102 (e.g., UEs 202) with contention based (PUSCH 224) transmissions 126.

For example, the base station 236 (e.g., eNB) transmits a cell specific nominal component or parameter $P_{O\_NOMINAL\_PUSCH}(3)$ 294 to the UE 202 by higher layer signaling 238. Additionally or alternatively, the base station 236 transmits a UE specific component or parameter $P_{O\_UE\_PUSCH}(3)$ 201 to the UE 202 by higher layer signaling 238. Additionally or alternatively, the base station 236 transmits a parameter $\alpha(3)$ 203 to the UE 202 by higher layer signaling 238. For example, the eNB 236 may transmit $P_{O\_NOMINAL\_PUSCH}(3)$ 288, $P_{O\_UE\_PUSCH}(3)$ 290 and/or $\alpha(3)$ 292 using the PDCCH 228. It should be noted that $P_{O\_PUSCH}(3)$ 258, $P_{O\_NOMINAL\_PUSCH}(3)$ 260, $P_{O\_UE\_PUSCH}(3)$ 266 and/or $\alpha(3)$ 256 (included in contention based power control parameters 212, for example) are different parameters than $P_{O\_PUSCH}(j)$, $P_{O\_NOMINAL\_PUSCH}(j)$, $P_{O\_UE\_PUSCH}(j)$ and/or $\alpha(j)$ where j=0, 1, or 2 (which may be considered to be included in normal power control parameters 218). For example, $P_{O\_NOMINAL\_PUSCH}(3)$ 288, $P_{O\_UE\_PUSCH}(3)$ 290 and/or $\alpha(3)$ 292 may be set to lower values than $P_{O\_PUSCH}(j)$, $P_{O\_NOMINAL\_PUSCH}(j)$, $P_{O\_UE\_PUSCH}(j)$ and/or $\alpha(j)$ where j=0, 1 and may be set to higher values than where j=2. However, this may be changed by a base station 136 (e.g., eNB 236) decision. In some deployments, for example, the base station 136 (e.g., eNB 236) may set the parameters for contention based PUSCH (e.g., $P_{O\_NOMINAL\_PUSCH}(3)$ 288, $P_{O\_UE\_PUSCH}(3)$ 290 and/or $\alpha(3)$ 292) to a higher value(s). By having this signaling, the base station 136 (e.g., eNB 236) may have full and/or flexible control. In this manner, the base station 136 (e.g., eNB 236) may be able to regulate a wireless communication devices' 102 (e.g., UEs' 202) power on the contention based PUSCH and thereby give preferential access to some wireless communication devices 102 (e.g., UEs 202) on this channel at the expense of others.

$P_{O\_PUSCH}(3)$ 258 may be a contention based power control parameter 212 comprising the sum of $P_{O\_NOMINAL\_PUSCH}(3)$ 260 and $P_{O\_UE\_PUSCH}(3)$ 266. $\alpha(3)$ 256 may be fixed as $\alpha(3)=1$, since this may reduce the signaling overhead and may take care of path loss fully. For example, a value for $\alpha$ that is less than 1 may mean that the power offset by a path loss (PL) value is not fully compensated, since PL×$\alpha$. In one configuration, $\alpha(3)$ 201 may not be transmitted (e.g., as $\alpha(3)$ 292), or may be implicitly signaled (e.g., j=3) when $\alpha(3)$ 256 is fixed, since $\alpha(3)=1$ when contention based transmissions (e.g., j=3) are being used.

Thus, the one or more UEs 202 may control their transmit power for contention based PUSCH transmissions (or retransmissions) 226 based on $P_{O\_NOMINAL\_PUSCH}(3)$ 260, $P_{O\_UE\_PUSCH}(3)$ 266 and/or $\alpha(3)$ 256. For example, the contention based power control parameters $P_{O\_NOMINAL\_PUSCH}(3)$ 260, $P_{O\_UE\_PUSCH}(3)$ 266 and/or $\alpha(3)$ 256 may be applied to the normal power control function 216 (e.g., Equation (1)) and/or to the contention based power control functions A, B and/or C 206, 208, 210.

The base station (e.g., eNB) 236 may therefore control the power of contention based PUSCH transmissions 226 in cell specific manner and/or a wireless communication device 202 (e.g., UE) specific manner. For example, the eNB 236 may control the power of contention based PUSCH transmissions 226 in a cell specific manner using the cell specific parameter $P_{O\_NOMINAL\_PUSCH}(3)$ 294 and in a UE specific manner using the UE specific parameter $P_{O\_UE\_PUSCH}(3)$ 201.

It should be noted that the contention based power control parameters 212 may be signaled implicitly. For example, the base station 236 may use a signaling offset value to $P_{O\_PUSCH}(0)$, $P_{O\_PUSCH}(1)$, $P_{O\_NOMINAL\_PUSCH}(0)$ $P_{O\_UE\_PUSCH}(0)$, $P_{O\_NOMINAL\_PUSCH}(1)$ and/or $P_{O\_UE\_PUSCH}(1)$ (e.g., to signal $P_{O\_PUSCH}(3)$ 258, $P_{O\_NOMINAL\_PUSCH}(3)$ 260 and/or $P_{O\_UE\_PUSCH}(3)$ 266).

In a configuration where the contention based grant 230 includes (e.g., is defined as carrying) a TPC command ($\delta_{CB\_PUSCH}$) 232, the eNB 236 may dynamically control the power of a contention based PUSCH transmission 226 using the TPC command 232. However, the UE 202 may manage the current PUSCH power control adjustment state (e.g., $f(i)$). The TPC command 232 may then be applied out of (e.g., independent from) $f(i)$.

In one configuration, contention based power control function A 206 may set the transmit power (e.g., $P_{PUSCH}$) of the UE 202 for the PUSCH 224 transmission in subframe i. Contention based power control function A 206 may be formulated as illustrated in Equation (4).

$$P_{PUSCH}(i)=\min\{P_{CMAX}, 10\ \log_{10}(M_{PUSCH}(i))+P_{O\_PUSCH}(j)+\alpha(j)\cdot PL+\Delta_{TF}(i)+f(i)+f_2(i)\} \quad (4)$$

In Equation (4), the transmit power $P_{PUSCH}(i)$ is expressed in units of dBm. Furthermore, $f_2(i)=\delta_{CB\_PUSCH}(i-K_{PUSCH})$ 284 and may be signaled on the PDCCH 228 (e.g., as $\delta_{CB\_PUSCH}(i-K_{PUSCH})$ 232) with a contention based grant 230 on a subframe $i-K_{PUSCH}$. Also, $f(i)=f(i-1)+\delta_{PUSCH}(i-K_{PUSCH})$ or $f(i)=f(i-1)$ 282 in Equation (4). $\delta_{PUSCH}(i-K_{PUSCH})$ may be signaled on the PDCCH 228 with 3/3A on subframe $i-K_{PUSCH}$ if the wireless communication device 102 (e.g., UE 202) detects a PDCCH 228 with DCI format 3/3A and a PDCCH 228 with a contention based grant and if accumulation is enabled. It is also noted that a contention based grant 230 may be valid when UEs 202 do not have a semi-persistent grant, a dynamic scheduled grant 120 and/or a random access response grant. By using this formulation or definition, the wireless communication device 202 (e.g., UE) may manage the current PUSCH 224 power control adjustment state (e.g., given by $f(i)$ 282). In this way, the UE 202 may easily return to the normal PUSCH procedure (e.g., using normal power control 214) after a contention based PUSCH transmission 226.

In Equation (4), the transmit power may be based on a current power control adjustment state (e.g., given by $f(i)$ 282). Furthermore, the transmit power may be adjusted based on $f_2(i)=\delta_{CB\_PUSCH}(i-K_{PUSCH})$ 284. Because the transmit power may be based on the current power control adjustment state, each UE's 202 power detected at the eNB 236 can be normalized.

In another configuration, contention based power control function B 208 may set $P_{PUSCH}$ of UE 202 for the PUSCH 224 transmission in subframe i. Contention based power control function B 208 may be formulated as illustrated in Equation (5).

$$P_{PUSCH}(i)=\min\{P_{CMAX}, 10\log_{10}(M_{PUSCH}(i))+ P_{O\_PUSCH}(j)+\alpha(j)\cdot PL+\Delta_{TF}(i)f_2(i)\} \quad (5)$$

In Equation (5), $P_{PUSCH}(i)$ is expressed in units of dBm. Furthermore, $f_2(i)=\delta_{CB\_PUSCH}(i-K_{PUSCH})$ 284 and may be signaled on the PDCCH 228 with a contention based grant 230 on a subframe $i-K_{PUSCH}$. In Equation (5), the transmit power ($P_{PUSCH}(i)$) does not depend on $f(i)$ 282. By using this formulation or definition, the UE 202 may manage (e.g., store) the current PUSCH power control adjustment state (e.g., given by $f(i)$ 282) and easily return to the normal PUSCH procedure (e.g., using normal power control 214) after a contention based PUSCH transmission 226.

The difference between contention based power control function A 206 (e.g., Equation (4)) and contention based power control function B 208 (e.g., Equation (5)) may be related to whether accumulation is applied for a TPC command 232 of a contention based grant 230 or not. In one configuration, contention based power control function A 206 and contention based power control function B 208 may be switched based on a UE-specific parameter Accumulation-enabled 207 provided by higher layers 238. If accumulation is enabled based on the UE-specific parameter Accumulation-enabled 207 provided by higher layers 238, contention based power control function A 206 may be used. Otherwise, contention based power control function B 208 may be used. In another configuration, only contention based power control function A 206 or only contention based power control function B 208 (instead of switching both) may be used.

Contention based power control function A 206 and/or contention based power control function B 208 may be applied in case that contention based power control parameters 212 (e.g., $P_{O\_NOMINAL\_PUSCH}(3)$ 260, $P_{O\_UE\_PUSCH}(3)$ 266 and/or $\alpha(3)$ 256) are not used. For example, $P_{O\_NOMINAL\_PUSCH}(1)$, $P_{O\_UE\_PUSCH}(1)$ and/or $\alpha(1)$ (e.g., from the normal power control parameters 218) may be "reused" for the contention based PUSCH transmission 226. More specifically, for instance, normal power control parameters 218 (e.g., $P_{O\_NOMINAL\_PUSCH}(1)$, $P_{O\_UE\_PUSCH}(1)$ and/or $\alpha(1)$) may be used with contention based power control function A 206 and/or contention based power control function B 208.

If power ramping is applied for a contention based PUSCH transmission 226, $P_{O\_PUSCH}(3)$ 258 may be set to a lower value such that interference may be further mitigated. This may possibly be set by the wireless communication device 102 (e.g., UE 202) and/or the base station 236 (e.g., eNB 236), depending on the configuration. For contention based power function A 206 and/or contention based power function B 208, $f_2(i)$ 284 may be alternatively defined as $f_2(i)=\delta_{CB\_PUSCH}(i-K_{PUSCH})+\Delta P_{CB\_rampup}$ 284 or $f_2(i)=\Delta_{CB\_rampup}$ 284 (e.g., if power ramping is applied). $\Delta_{CB\_rampup}$ may be provided by higher layers 238 and corresponds to the total power ramp-up from the first to the last failed contention based PUSCH transmission 226.

In another configuration, any TPC command 232 may be disabled. TPC commands 232 may be disabled in contention based power control function C 210 as illustrated in Equation (6).

$$P_{PUSCH}(i)=\min\{P_{CMAX}, 10\log_{10}(M_{PUSCH}(i))+ P_{O\_PUSCH}(j)+\alpha(j)\cdot PL+\Delta_{TF}(i)\} \quad (6)$$

In Equation (6), $P_{PUSCH}(i)$ is expressed in units of dBm. In this configuration, contention based power control function C 210 is simple and omits $f(i)$ 282 and $f_2(i)$ 284 (which may depend on the TPC command 232 or $f_2(i)=\delta_{CB\_PUSCH}(i-K_{PUSCH})$ 232). Thus, the implementation of the UE 202 may be simplified in this configuration.

In summary, the systems and methods disclosed herein may effectively control the power for a contention based PUSCH transmission 226. This may be accomplished by using contention based power control parameters 212 that are different from normal power control parameters 218 and/or by using one or more contention based power control functions 206, 208, 210 (e.g., Equations (4), (5), (6)) that are different from the normal power control function 216 (e.g., Equation (1)). The systems and methods disclosed herein may allow power control for a contention based PUSCH transmission 226 to be performed out of the power control loop for a normal PUSCH transmission. Furthermore, the systems and methods disclosed herein may include a power control command 232 in a contention based grant 230. Additionally, the systems and methods disclosed herein may allow contention based power control parameters 140 to be signaled by higher layer signaling 138.

Figure 3:
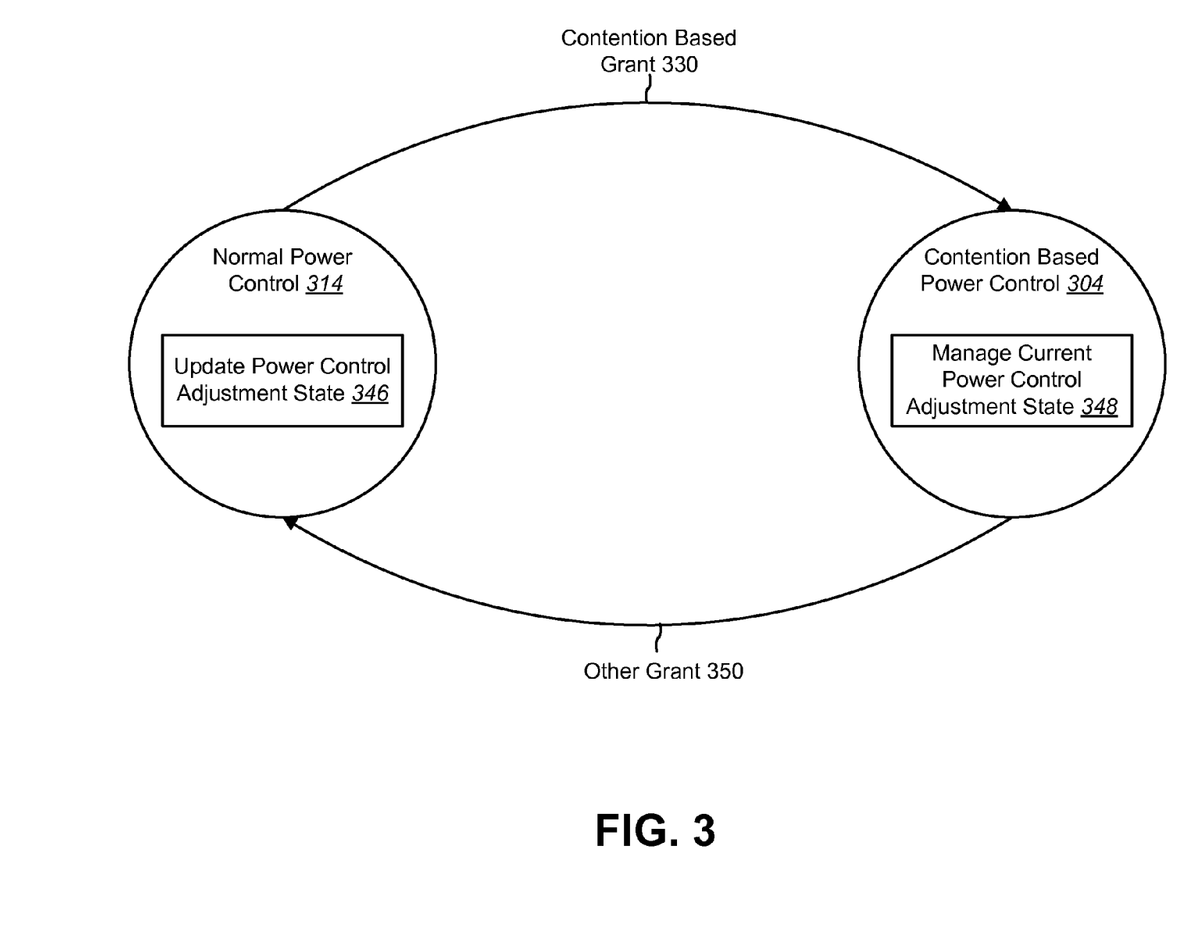
FIG. 3 is a diagram illustrating state transitions between normal power control and contention based power control on a wireless communication device.

FIG. 3 is a diagram illustrating state transitions between normal power control 314 and contention based power control 304 on a wireless communication device 102. For example, a wireless communication device 102 may use normal power control 314 for certain grants. For example, normal power control 314 may be used during transmissions for a semi-persistent grant, a dynamic scheduled grant 120 and/or a random access response grant. During normal power control 314, the wireless communication device 102 may update a power control adjustment state 346. The power control adjustment state may be represented as $f(i)$ as illustrated in Equations (1), (2), (3) and/or (4).

The wireless communication device 102 may receive a contention based grant 330. The wireless communication device 102 may transition to contention based power control 304 for contention based transmissions corresponding to the contention based grant 330. The contention based power control 304 may manage a current power control adjustment state 348. For example, a power control adjustment state $f(i)$ may be managed 348 in order to enable transitioning back to normal power control 314 upon completing the contention based transmission. In one configuration, for example, the power control adjustment state may be used in a contention based power control function as $f(i)=f(i-1)+\delta_{PUSCH}(i-K_{PUSCH})$ or $f(i)=f(i-1)$ (see Equation (4)) such that $f(i)$ is managed during contention based power control 304. In another configuration, the power control adjustment state $f(i)$ is omitted from the contention based power control function (see Equations (5) and (6)) such that it is not updated, but managed during contention based power control 304.

Upon completing contention based transmissions, the wireless communication device 102 may transition back to normal power control 314. For example, the wireless communication device 102 may receive another grant 350 that is not a contention based grant 330. For instance, the wireless communication device 102 may receive a semi-persistent grant, a dynamic scheduled grant or a random access response grant from the base station 136. The wireless communication device 102 may thus transition back to and use normal power control 314 during transmissions corresponding to one or more other grants 350. Because the power control adjustment state $f(i)$ has been managed 348 during contention based power control 304, the transition back into normal power control 314 may be simple. This contention based PUSCH may operate in parallel with normal procedures and may operate in additional function to normal procedures. Thus, it may be beneficial for the current power control adjustment state to be managed such that the introduction of contention based PUSCH does not impact the current implementation.

Figure 4:
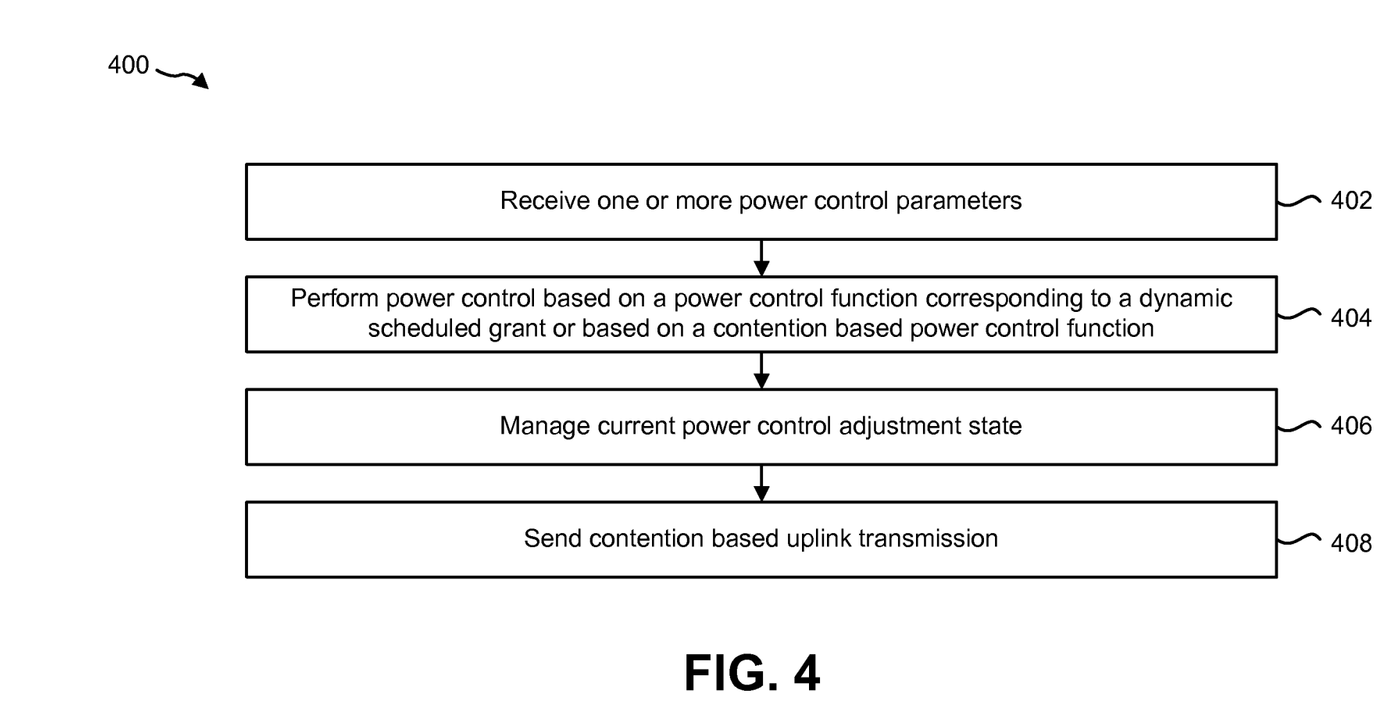
FIG. 4 is a flow diagram illustrating one configuration of a method for controlling power for contention based uplink transmissions.

FIG. 4 is a flow diagram illustrating one configuration of a method 400 for controlling power for contention based uplink transmissions. A wireless communication device 102 may receive 402 one or more power control parameters. For example, a base station 136 may send one or more power control parameters, which may be received 402 by the wireless communication device 102. In one configuration, these power control parameters may be received 402 as part of a contention based grant 130.

The wireless communication device 102 may perform 404 power control based on a normal power control function 116 corresponding to a dynamic scheduled grant 120 or based on a contention based power control function 106, 108, 110. For example, the wireless communication device 102 may use the one or more received 402 power control parameters to execute the power control function being used.

In one configuration, the wireless communication device uses contention based power control parameters (e.g., $P_{O\_NOMINAL\_PUSCH}(3)$ 260, $P_{O\_UE\_PUSCH}(3)$ 266 and/or $\alpha(3)$ 256) that are different from the normal power control parameters 118 (e.g., $P_{O\_NOMINAL\_PUSCH}(j)$, $P_{O\_UE\_PUSCH}(j)$ and/or $\alpha(j)$ where j=0, 1, 2). These contention based power control parameters may be applied (e.g., in addition to or alternatively from normal power control parameters 118) to the normal power control function 116 (e.g., Equation (1)).

In another configuration, one or more contention based power control functions 106, 108, 110 (e.g., Equations (4), (5) and (6), respectively) are used. The normal power control parameters 118 and/or contention based power control parameters 112 may be applied to the one or more contention based power control functions 106, 108, 110 to perform 404 power control.

The wireless communication device 102 may manage 406 a current power control adjustment state (see FIG. 3). For example, the current power control adjustment state may be managed in or by a contention based power control function (e.g., Equation (4)) or may be omitted from the contention based power control function (e.g., Equations (5), (6)). When the normal power control function 116 (e.g., Equation (1)) is used in conjunction with contention based power control parameters 112, the current power control adjustment state may be stored for later use (e.g., when transitioning back to normal power control 114). This may enable an easy transition back to normal power control 114. In general, managing a current power control adjustment state may mean that the state is managed irrespective of a contention based transmission 126 (e.g., Contention Based-Physical Uplink Shared Channel or CB-PUSCH transmission 226).

The wireless communication device 102 may send 408 a contention based uplink transmission 126. For example, the wireless communication device 102 may transmit data using a resource on the uplink shared channel 124 designated by a contention based grant 130.

Figure 5:
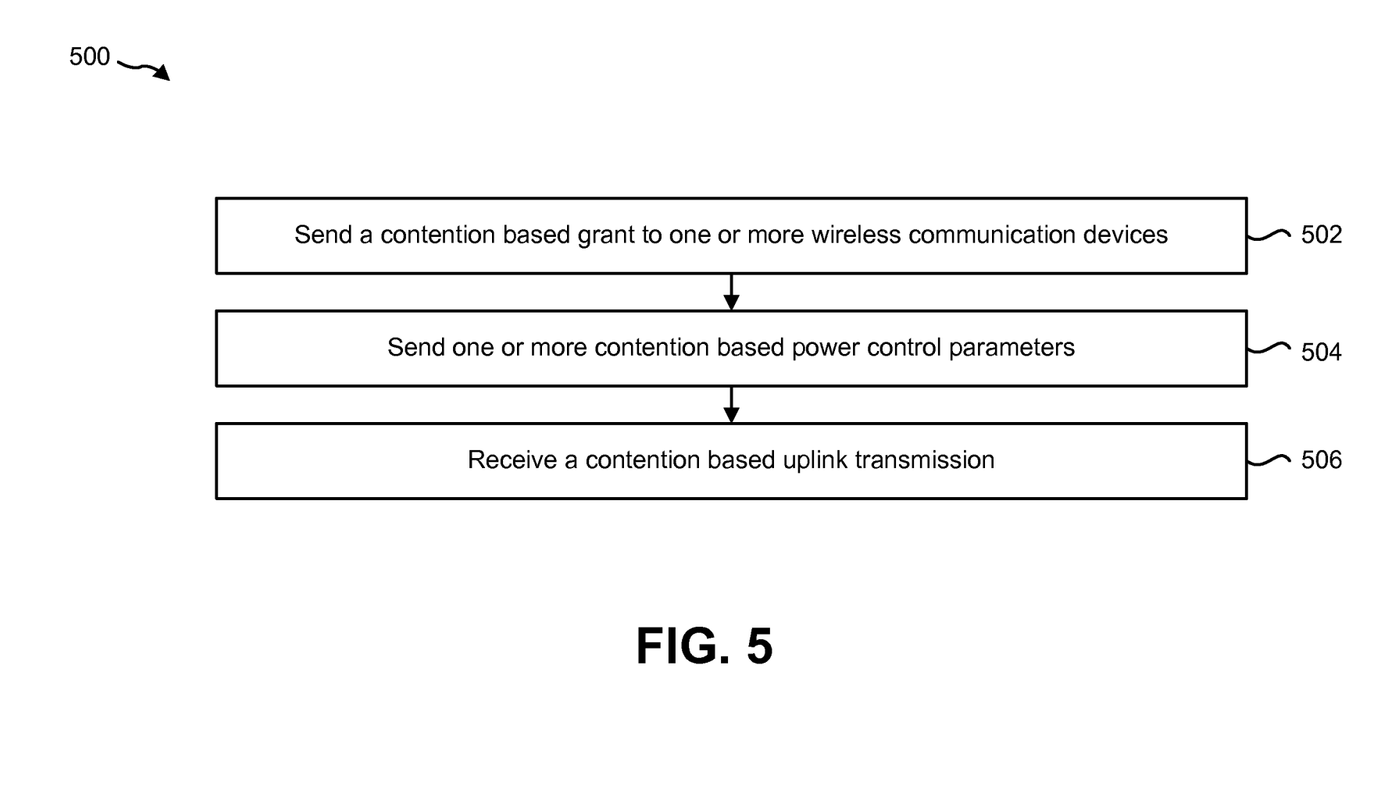
FIG. 5 is a flow diagram illustrating one configuration of a method for controlling power for contention based uplink transmissions by a base station.

FIG. 5 is a flow diagram illustrating one configuration of a method 500 for controlling power for contention based uplink transmissions by a base station 136. The base station 136 may send 502 a contention based grant 130 to one or more wireless communication devices 102. As mentioned above, the contention based grant 130 may indicate that the one or more wireless communication devices 102 may attempt a contention based transmission 126 using a particular resource on the uplink shared channel 124. In one configuration, the contention based grant includes a power control command (e.g., TPC or $\delta_{CB\_PUSCH}(i-K_{PUSCH})$ 232).

The base station 136 may send 504 one or more contention based power control parameters 140. In one configuration, the base station 136 generates and/or sends 504 contention based power control parameters 140 such as $P_{O\_NOMINAL\_PUSCH}(3)$ 294, $P_{O\_UE\_PUSCH}(3)$ 201 and/or $\alpha(3)$ 203. The base station 136 may additionally or alternatively send other parameters such as normal power control parameters 118, for example.

The base station 136 may receive 506 a contention based uplink transmission 126. For example, the one or more the wireless communication devices 102 (that have received a contention based grant 130) may attempt to send a contention based transmission 126. The base station 136 may receive the contention based transmission 126, though a collision between contention based transmissions 126 from multiple wireless communication devices 102 may occur.

Figure 6:
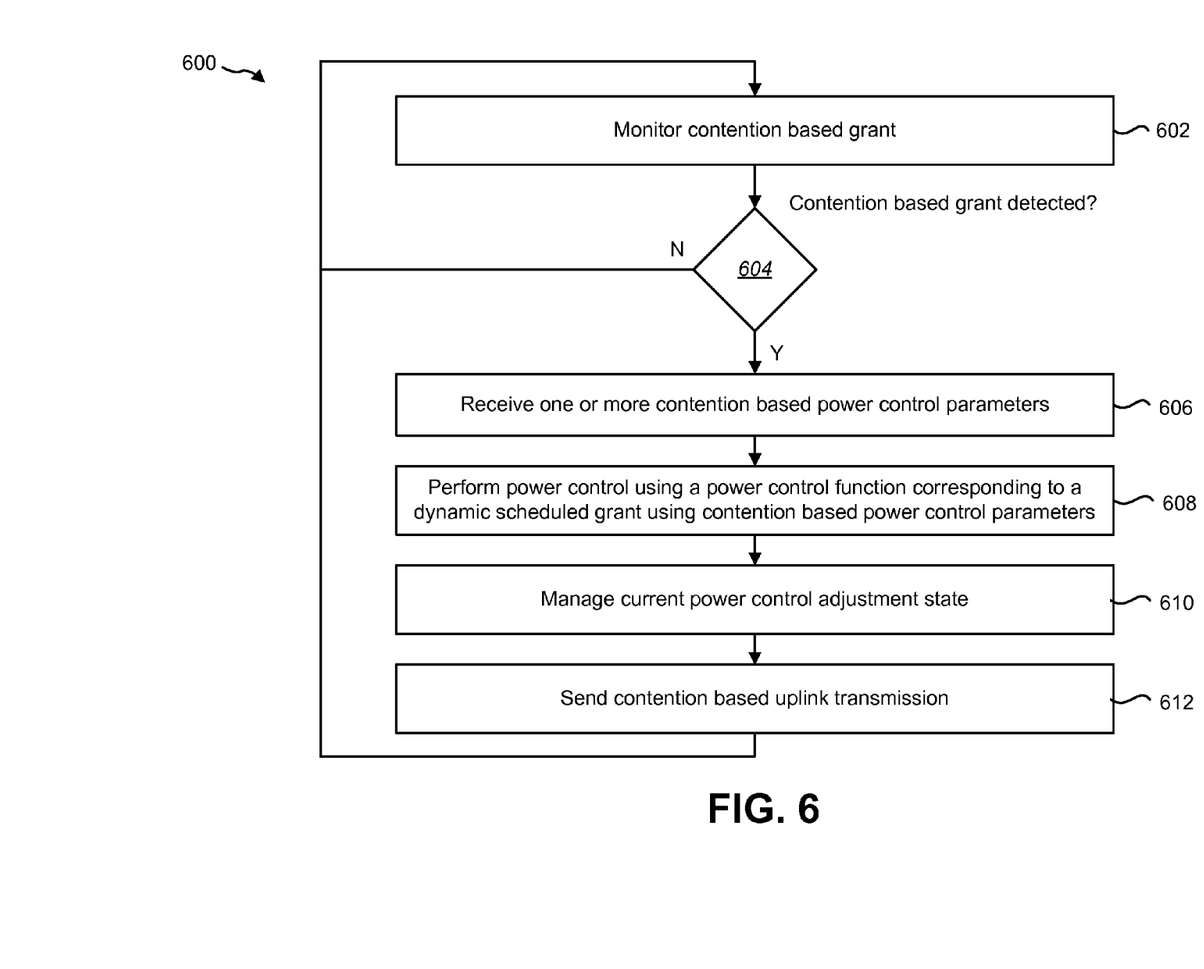
FIG. 6 is a flow diagram illustrating more detail of one configuration of a method for controlling power for contention based uplink transmissions.

FIG. 6 is a flow diagram illustrating more detail of one configuration of a method 600 for controlling power for contention based uplink transmissions. A wireless communication device 102 may monitor 602 for a contention based grant 130. For example, the wireless communication device 102 may monitor 602 received messages from the base station 136. The wireless communication device 102 may determine 604 whether a contention based grant 130 is detected. For example, the wireless communication device 102 may process messages from the base station 136 to determine if a message is a contention based grant 130.

If the wireless communication device 102 determines 604 that no contention based grant 130 was detected, it 102 may return to monitoring 602 for a contention based grant 130. However, if the wireless communication device 102 determines 604 that a contention based grant 130 is detected, it 102 may receive 606 one or more contention based power control parameters 112. For example, the base station 136 may generate and/or send one or more contention based power control parameters 140 to the wireless communication device 102.

The wireless communication device 102 may perform 608 power control using a power control function corresponding to a dynamic scheduled grant 120 (e.g., a normal power control function 116) using contention based power control parameters 112. For example, the wireless communication device 102 may apply contention based power control parameters 112 such as $P_{O\_NOMINAL\_PUSCH}(3)$ 260, $P_{O\_UE\_PUSCH}(3)$ 266 and/or $\alpha(3)$ 256 to the normal power control function 116 (e.g., Equation (1)), for example. For instance, the wireless communication device 102 may use $P_{O\_NOMINAL\_PUSCH}$ (3) 260 and $P_{O\_UE\_PUSCH}(3)$ 266 to determine $P_{O\_PUSCH}(3)$ 258, which may be applied to the normal power control function 216.

The wireless communication device 102 may manage 610 a current power control adjustment state. For example, the wireless communication device 102 may store the power control adjustment state before computing the contention based power (e.g., according to Equation (1)). The power control adjustment state may be managed during contention based power control 104 and retrieved for use in normal power control 114 following a contention based transmission 126. The wireless communication device 102 may send 612 a contention based uplink transmission 126. The wireless communication device 102 may return to monitoring 602 for a contention based grant.

Figure 7:
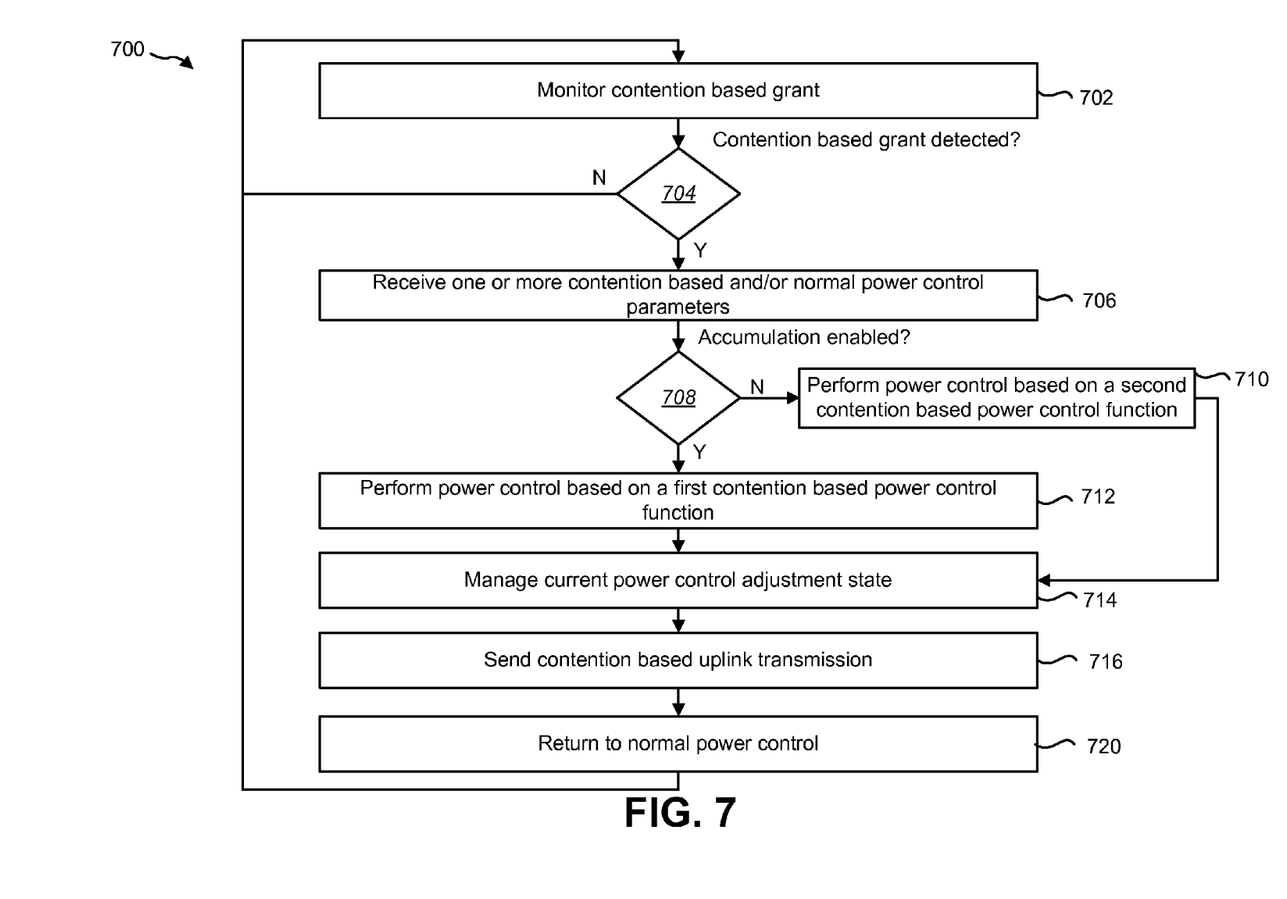
FIG. 7 is a flow diagram illustrating more detail on one configuration of a method for controlling power for contention based uplink transmissions.

FIG. 7 is a flow diagram illustrating more detail on one configuration of a method 700 for controlling power for contention based uplink transmissions. A wireless communication device 102 may monitor 702 for a contention based grant 130. For example, the wireless communication device 102 may monitor 702 received messages from the base station 136. The wireless communication device 102 may determine 704 whether a contention based grant 130 is detected. For example, the wireless communication device 102 may process messages from the base station 136 to determine 704 if a message is a contention based grant 130.

If the wireless communication device 102 determines 704 that no contention based grant 130 was detected, it 102 may return to monitoring 702 for a contention based grant 130. However, if the wireless communication device 102 determines 704 that a contention based grant 130 is detected, it 102 may receive 706 one or more contention based power control parameters 112. For example, the base station 136 may generate and/or send one or more contention based power control parameters 140 to the wireless communication device 102. Alternatively or in addition, the wireless communication device 102 may receive other power control parameters, such as normal power control parameters 118.

The wireless communication device 102 may determine 708 whether accumulation is enabled. For example, the wireless communication device 102 may receive a message or parameter (e.g., Accumulation-enabled 207 from the base station 136) indicating whether or not accumulation should be used. If the wireless communication device 102 determines 708 that accumulation is enabled, it 102 performs 712 power control based on a first contention based power control function. For example, the wireless communication device 102 performs 712 power control based on contention based power control function A 206 (e.g., Equation (4)). In performing 712 power control, the wireless communication device 102 may apply normal power control parameters 118, contention based power control parameters 112 or a combination of both 118, 112.

If the wireless communication device 102 determines 708 that accumulation is not enabled, it 102 may perform 710 power control based on a second contention based power control function. For example, the wireless communication device 102 may use contention based power control function B 208 (e.g., Equation (5)) to perform 710 power control. In performing 710 power control, the wireless communication device 102 may apply normal power control parameters 118, contention based power control parameters 112 or a combination of both 118, 112.

The wireless communication device 102 may manage 714 a current power control adjustment state. For example, if the first contention based power control function is used to perform 712 power control, the power control adjustment state in the subframe i may be updated from the power control adjustment state in the previous subframe i−1 irrespective of a contention based PUSCH transmission (e.g., $f(i)=f(i-1)+\delta_{PUSCH}(i-K_{PUSCH})$ or $f(i)=f(i-1)$). If the second contention based power control function is used to perform 710 power control, the second contention based power control function (e.g., Equation (5)) may omit or not depend on the power control adjustment state (e.g., $f(i)$). The power control adjustment state (e.g., $f(i)$) may thus be managed or stored for later use.

The wireless communication device 102 may send 716 a contention based uplink transmission 126. For example, the wireless communication device 102 may send information or data on an uplink shared channel 124 on a contention basis. The wireless communication device 102 may return 720 to normal power control 114. For example, if the wireless communication device 102 receives a grant (e.g., semi-persistent grant, dynamic scheduled grant 120, random access response grant, etc.) other than a contention based grant 130, the wireless communication device 102 may return to normal power control 114 and to monitoring 702 for a contention based grant 130. However, if the wireless communication device 102 receives another contention based grant 130, the wireless communication device 102 may continue contention based power control 104.

Figure 8:
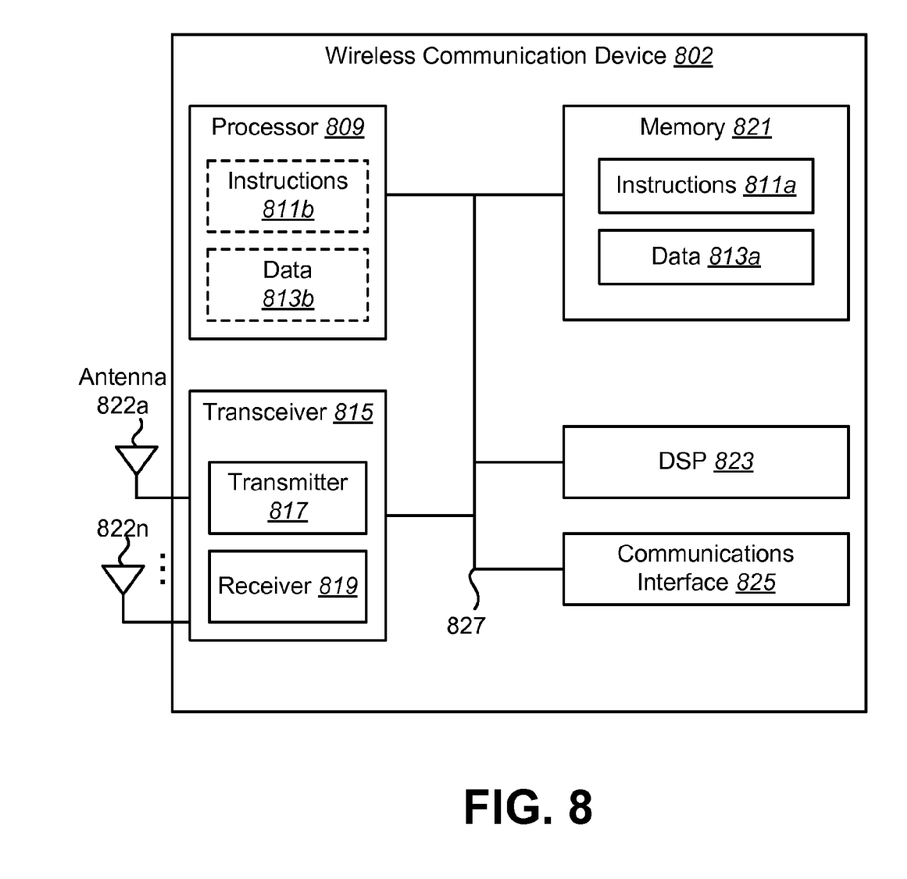
FIG. 8 illustrates various components that may be utilized in a wireless communication device.

FIG. 8 illustrates various components that may be utilized in a wireless communication device 802. The wireless communication device 802 may be utilized as the wireless communication device 102 or UE 202 illustrated previously. The wireless communication device 802 includes a processor 809 that controls operation of the wireless communication device 802. The processor 809 may also be referred to as a CPU. Memory 821, which may include both read-only memory (ROM), random access memory (RAM) or any type of device that may store information, provides instructions 811a and data 813a to the processor 809. A portion of the memory 821 may also include non-volatile random access memory (NVRAM). Instructions 811b and data 813b may also reside in the processor 809. Instructions 811b and/or data 813b loaded into the processor 809 may also include instructions 811a and/or data 813a from memory 821 that were loaded for execution or processing by the processor 809. The instructions 811b may be executed by the processor 809 to implement the systems and methods disclosed herein.

The wireless communication device 802 may also include a housing that contains a transmitter 817 and a receiver 819 to allow transmission and reception of data. The transmitter 817 and receiver 819 may be combined into a transceiver 815. One or more antennas 822a-n are attached to the housing and electrically coupled to the transceiver 815.

The various components of the wireless communication device 802 are coupled together by a bus system 827 which may include a power bus, a control signal bus, and a status signal bus, in addition to a data bus. However, for the sake of clarity, the various buses are illustrated in FIG. 8 as the bus system 827. The wireless communication device 802 may also include a digital signal processor (DSP) 823 for use in processing signals. The wireless communication device 802 may also include a communications interface 825 that provides user access to the functions of the wireless communication device 802. The wireless communication device 802 illustrated in FIG. 8 is a functional block diagram rather than a listing of specific components.

Figure 9:
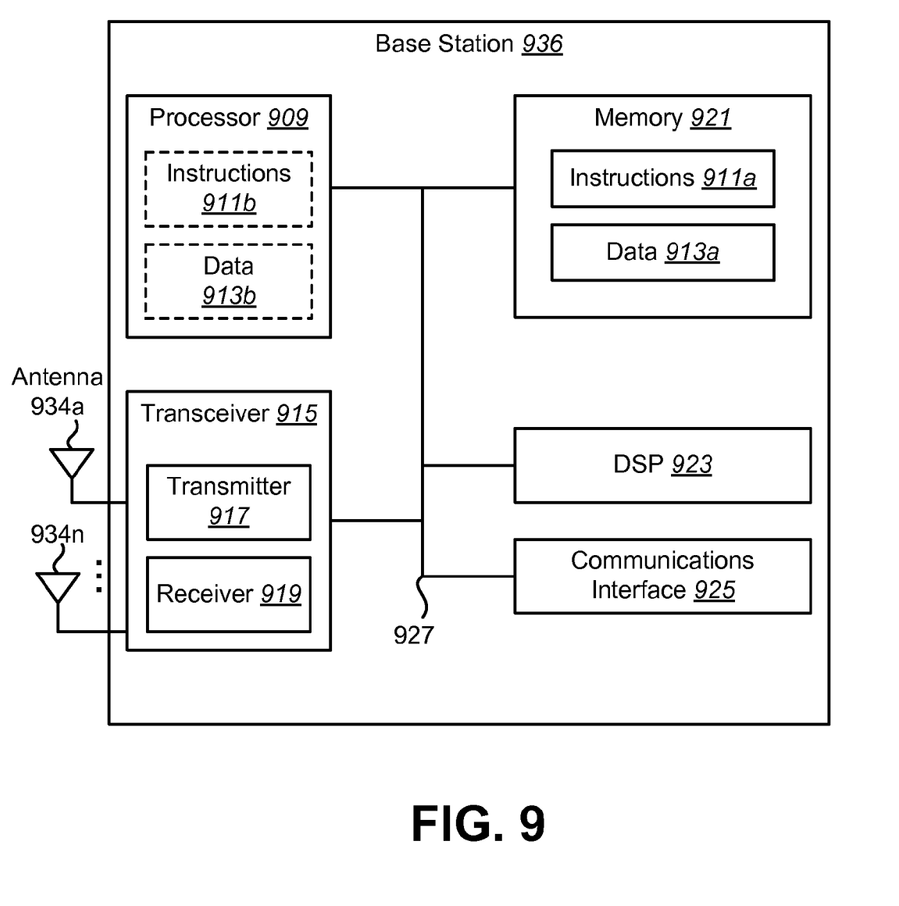
FIG. 9 illustrates various components that may be utilized in a base station.

FIG. 9 illustrates various components that may be utilized in a base station 936. The base station 936 may be utilized as the base station 136 or eNB 236 illustrated previously. The base station 936 may include components that are similar to the components discussed above in relation to the wireless communication device 802, including a processor 909, memory 921 that provides instructions 911a and data 913a to the processor 909, instructions 911b and data 913b that may reside in or be loaded into the processor 909, a housing that contains a transmitter 917 and a receiver 919 (which may be combined into a transceiver 915), one or more antennas 934a-n electrically coupled to the transceiver 915, a bus system 927, a DSP 923 for use in processing signals, a communications interface 925, and so forth.

The term "computer-readable medium" or "processor-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another, combined into a single step or incorporated into other ancillary aspects of the communication system without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A wireless communication device configured for controlling power for contention based uplink transmissions, comprising:
   a processor;
   memory in electronic communication with the processor;
   instructions stored in the memory, the instructions being executable to:
      receive one or more power control parameters;
      perform contention based power control for physical uplink shared channel (PUSCH) transmissions, wherein the contention based power control is different from dynamic scheduled grant power control corresponding to PUSCH transmissions; and
      send a contention based PUSCH transmission.

2. The wireless communication device of claim 1, wherein the instructions are further executable to manage a power control adjustment state.

3. The wireless communication device of claim 1, wherein the contention based power control uses one or more parameters different from parameters used for the dynamic scheduled grant power control.

4. The wireless communication device of claim 1, wherein the contention based power control uses one or more contention based power control functions that are different from a normal power control function used for the dynamic scheduled grant power control.

5. The wireless communication device of claim 1, wherein the one or more power control parameters are signaled by a higher layer, and wherein the higher layer comprises one of a radio resource control layer, a radio link control layer and a medium access control layer.

6. The wireless communication device of claim 1, wherein the one or more power control parameters comprise a parameter specific to the wireless communication device.

7. The wireless communication device of claim 1, wherein the one or more power control parameters comprise a parameter specific to a cell.

8. The wireless communication device of claim 1, wherein the instructions are further executable to receive a contention based grant.

9. The wireless communication device of claim 8, wherein the contention based grant comprises a power control command.

10. The wireless communication device of claim 1, wherein the wireless communication device is a User Equipment (UE).

11. A method for controlling power for contention based uplink transmissions, comprising:
    receiving one or more power control parameters;
    performing, on a wireless communication device, contention based power control for physical uplink shared channel (PUSCH) transmissions, wherein the contention based power control is different from dynamic scheduled grant power control corresponding to PUSCH transmissions; and
    sending a contention based PUSCH transmission.

12. The method of claim 11, further comprising managing a power control adjustment state.

13. The method of claim 11, wherein the contention based power control uses one or more parameters different from parameters used for the dynamic scheduled grant power control.

14. The method of claim 11, wherein the contention based power control uses one or more contention based power control functions that are different from a normal power control function used for the dynamic scheduled grant power control.

15. The method of claim 11, wherein the one or more power control parameters are signaled by a higher layer, and wherein the higher layer comprises one of a radio resource control layer, a radio link control layer and a medium access control layer.

16. The method of claim 11, wherein the one or more power control parameters comprise a parameter specific to the wireless communication device.

17. The method of claim 11, wherein the one or more power control parameters comprise a parameter specific to a cell.

18. The method of claim 11, further comprising receiving a contention based grant.

19. The method of claim 18, wherein the contention based grant comprises a power control command.

20. The method of claim 11, wherein the wireless communication device is a User Equipment (UE).

* * * * *